Sept. 5, 1967 W. J. BRUDER 3,340,341
METHOD OF PREPARING GRIDS
Filed July 1, 1963 2 Sheets-Sheet 1

INVENTOR.
Wallace J. Bruder
BY
Robert B Ingraham
AGENT

Sept. 5, 1967  W. J. BRUDER  3,340,341
METHOD OF PREPARING GRIDS
Filed July 1, 1963  2 Sheets-Sheet 2

INVENTOR.
Wallace J. Bruder
BY
Robert B. Ingraham
AGENT

United States Patent Office 3,340,341
Patented Sept. 5, 1967

3,340,341
METHOD OF PREPARING GRIDS
Wallace J. Bruder, Midland, Mich., assignor to The Dow Chemical Company, Midland, Mich., a corporation of Delaware
Filed July 1, 1963, Ser. No. 291,755
4 Claims. (Cl. 264—248)

This invention relates to a process for the preparation of grids. It more particularly relates to a method for the preparation of flanged grids from thermoplastic resinous materials.

Thermoplastic resinous grids oftentimes are of particular advantage when utilized as a packing for towers of the gas-liquid contact type. One particularly advantageous and beneficial form of packing comprises a grid having a plurality of flanges thereon. Such a grid, when disposed within a gas or vapor liquid contact tower, provides a relatively large surface, and each of the flanges provides a drip and splash area which tends to increase the effective area of liquid which is exposed to the gas or vapor. However, such grids present considerable expense in shipping from their point of manufacture to the location where they are to be installed in a gas liquid contact tower. Known grids of this nature are commonly prepared by injection molding to a solid section. When packed for shipment, the grids have a volume approximating that of the finished tower. Consequently, they are relatively fragile when compared to a solid piece of resinous material of like weight and occupy a relatively large volume. These characteristics result in considerable expense in packing as well as in shipping. Further, molded grids are relatively expensive as a suitable mold requires much machine work, and if grids of varying size are to be prepared, a separate mold usually must be made for each desired size.

It is an object of this invention to provide an improved method of preparing a grid type packing by means other than injection molding.

It is also an object of this invention to provide a method of preparing grid type packing which permits shipment of a finely fabricated article.

It is another object of this invention to provide a method for the fabrication of grid structures from thermoplastic resinous materials wherein the geometry may be readily varied.

These benefits and other advantages in accordance with the invention are achieved by providing a plurality of strips of thermoplastic resinous material forming in said strips a plurality of slots, said slots being in spaced relationship to each other and extending from one edge of the strip in a generally transverse direction, assembling said strips by engaging a slot of one strip with a slot of another strip to form a pluraltiy of lap joints and form a loose grid-like structure, flanging the edges of said strips while in a grid-like configuration by heating said edges of said strips to a temperautre sufficiently high to permit plastic flow, subsequently cooling said strips below the plastic flow temperature and providing a rigid grid structure.

These benefits and other advantages in accordance with the invention will become apparent upon examination of the following specification when taken in view of the drawing wherein.

Figure 1:
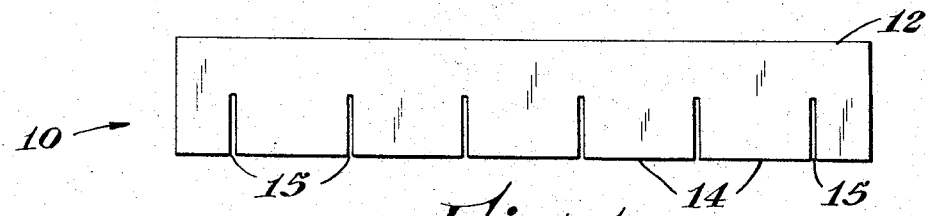
FIGURE 1 depicts a view of a strip utilized in the fabrication of grids in accordance with the invention.

In FIGURE 1 there is illustrated a side view of a strip generally designated by the reference numeral 10. The strip 10 has longitudinal edges 12 and 14. A plurality of slots 15 are formed in the strip 10. The slots 15 extend in a transverse direction from the edge 14 toward the edge 12 for a distance of about one-half of the width of the strip.

Figure 2:
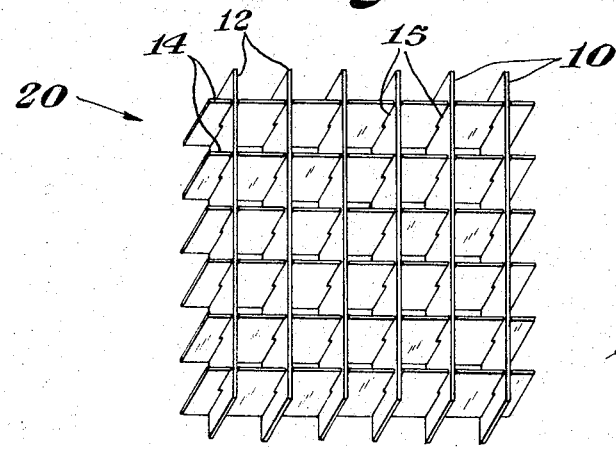
FIGURE 2 depicts a grid assembled from strips of FIGURE 1.

In FIGURE 2 there is illustrated a plurality of strips 10 assembled to form a grid generally designated by the the reference numeral 20. The grid 20 comprises two groups of strips 10. The strips 10 of each group are in parallel spaced relationship to each other and one of the groups has its strips 10 disposed substantially at right angles to the strips 10 of the remaining group, wherein the portions of the strips lying between the slots 15 and the edge 12 are disposed in a slot 15 of an opposed strip.

Figure 3:
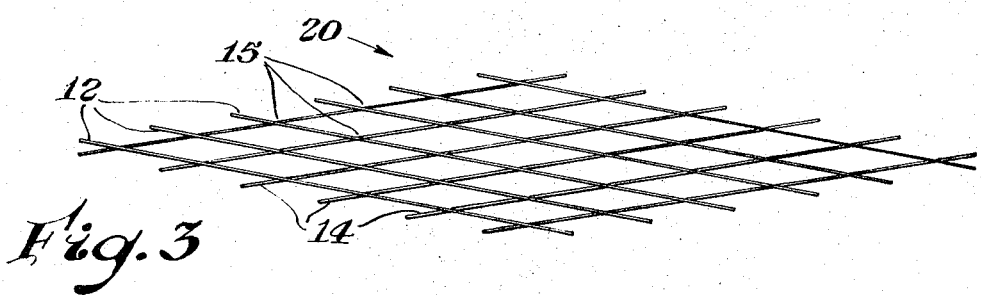
FIGURE 3 is a top view of the grid of FIGURE 2 in a collapsed form.

FIGURE 3 depicts a grid 20 of FIGURE 2 in a partially collapsed position. The width of the slots 15 is sufficient to provide a loose assembly which may readily be collapsed by pressure applied to opposed corners to give the configuration shown in FIGURE 3.

Figure 4:
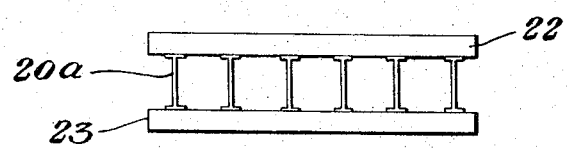
FIGURE 4 illustrates the flanging of a grid in accordance with FIGURE 2.

FIGURE 4 shows a grid 20a in the configuration of FIGURE 2 positioned between a pair of opposed platens 22 and 23. The platens are heated to a temperature sufficient to cause viscous flow of the thermoplastic material of the strips 10 and bond them together into a unitary grid body.

Figure 5:
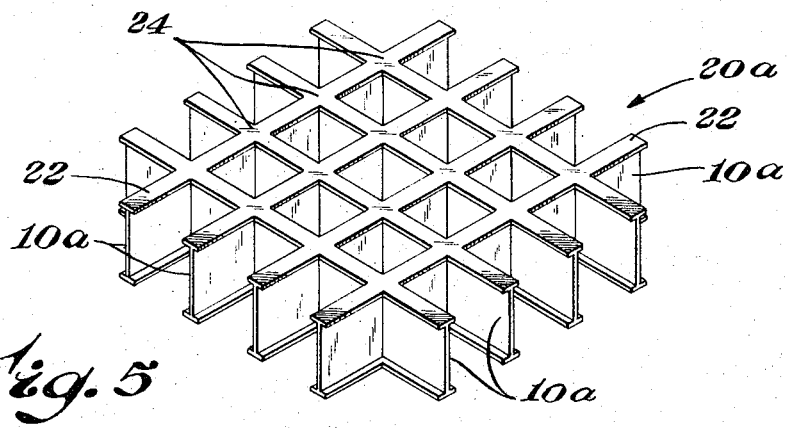
FIGURE 5 is a view of the part of the grid flanged in the operation of FIGURE 4.

FIGURE 5 depicts a view of a portion of the grid 20a formed by pressing the grid 20 between heated platens. The grid 20a comprises a plurality of strips 10a, each of the strips 10a having a flanged edge 22. The flanged edges 22 are bonded together at the locations 24 providing a rigid connection between the strips 10a.

Figure 6:
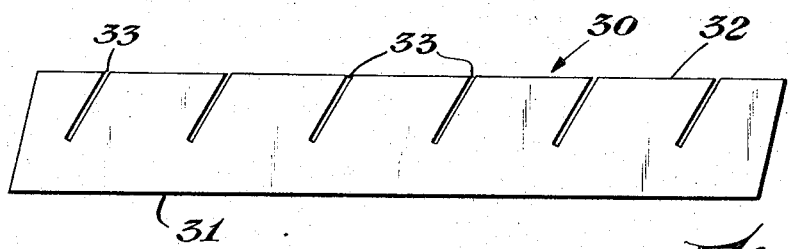
FIGURE 6 is a view of an alternate strip in accordance with the invention.

FIGURE 6 depicts an alternate variety of strip generally designated by the reference numeral 30. The strip has edge portions 31 and 32. The edge portion 31 is substantially linear where the edge portion 32 has a plurality of slots 33 formed in spaced parallel relationship to each other and extending into the strip 30 at an angle other than 90° from the edge 32. Assembly of strips of the general nature of strips 30 provides a grid which, when arranged in the general manner of FIGURE 2, provides a plurality of sloping surfaces rather than the vertical surfaces of FIGURE 2.

Figure 7:
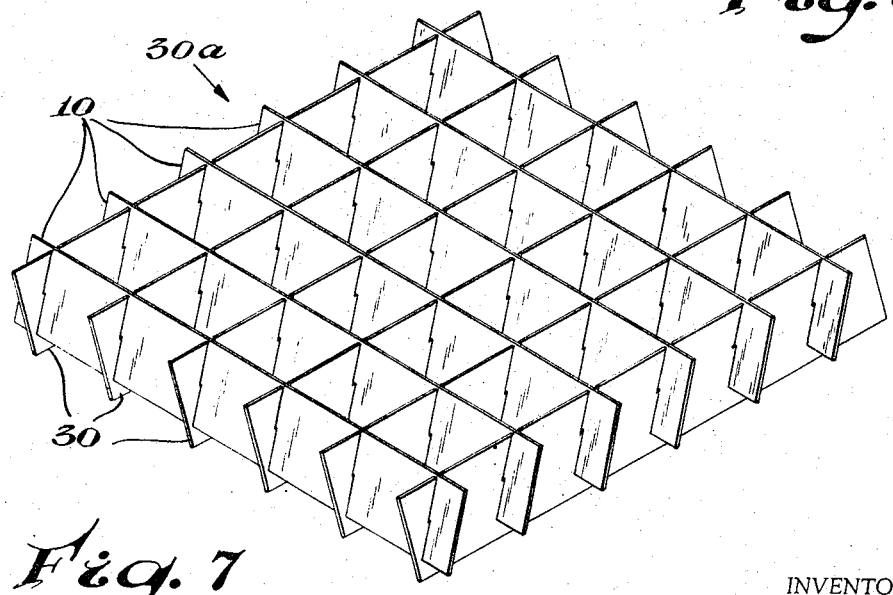
FIGURE 7 is a view of a collapsed grid fabricated utilizing strips in accordance with the FIGURES 1 and 6

FIGURE 7 depicts a view of an assembly 30a comprising a series of parallel strips 30 interlocked with a series of strips 10 wherein the assembly is in a flattened position generally similar to that of FIGURE 3.

A wide variety of thermoplastic resinous materials may be employed in the practice of the invention. It is generally advantageous to form such material into sheets by calendering, extruding, or pressing and subsequently slitting the sheets into relatively narrow strips which will be employed in forming the structure.

Typical thermoplastic resinous materials which are employed in the practice of the invention are polystyrene, polyvinyl chloride, polyethylene, polypropylene, polytetrafluoroethylene, and all other sheet formable thermoplastic polymeric or copolymeric materials. Advantageously, any of the conventional fillers, pigments and stabilizers may be incorporated into the sheet stock by well known conventional methods. Strips such as 10 and 30 are readily prepared by cutting or punching appropriate sized strips of sheet stock and are readily assembled into the configuration such as shown in FIGURES 2, 3 and 7 by forming a plurality of half lap joints. Thus, the basic loose grid is provided which can be readily folded into a generally flat configuration for shipping and storage. The flattened grid such as is illustrated in FIGURES 3 and 7 occupies only a very small fraction of the total volume of the expanded grid shown in FIGURE 2. Thus large quantities of the grid material may be shipped occupying only a relatively small volume. When it is desired to form a rigid grid the flattened configuration is readily formed into the configuration of FIGURE 2 by gentle pressure. The grid is then flanged in such a manner that portions of the flanges flow together and unite the entire assembly into a single unitary body. Advantageously the grids are rigidized between a pair of opposed heated platens such as are shown in FIGURE 3. The temperature of the platens must be sufficient to cause the thermoplastic resinous material in the grid to flow and become permanently deformed. The platens are brought into contact with the edges of strips and forced closer together until the desired flanged width has formed. The platens are removed and the completed grid is cooled to a temperature below its softening point. Alternately a single heated platen is employed if only one edge of the grid is to be softened. The rigidized grid may also be formed by applying platens smaller than the total area of the desired grid by making a sufficient number of applications of the hot platen until the entire grid has been flanged.

It is usually advantageous to employ as a surface on the platens a material which does not adhere to the thermoplastic resin composition at forming temperatures. Conventional mold release agents may be employed such as waxes, siloxane derivatives and similar anti-adhesion preparations well known in the art. Alternately the platens may be covered with sheets of known adhesives, material having a higher flow temperature than the grid material such as polytetrafluoroethylene, polytetrafluoroethylene glass coated cloth and the like.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method for the preparation of grids from thermoplastic resinous material comprising
   supplying a plurality of elongated thermoplastic resinous strips, each of said strips having a plurality of slots in spaced relationship to each other and extending from one edge of the strip in a generally transverse direction,
   assembling said strips by engaging a slot of one strip with a slot of other strips to form a plurality of lap joints between the strips to form a loose grid-like structure,
   collapsing the grid-like structure to a generally flat configuration, subsequently repositioning the flattened structure into a grid-like structure,
   positioning said loose grid-like structure in a configuration generally approximating the configuration of the final desired article and
   heat fusing said assembly of strips together, to form a generally rigid structure by heating the edges of the strips to a temperature sufficiently high to cause plastic flow and bond one set of strips to the other set of strips and forming a flange on each edge of the strip and subsequently cooling the strips below the plastic flow temperature to provide a rigid grid-like structure.

2. A method of forming a rigidized grid structure comprising
   assembling a plurality of thermoplastic resinous elongated strip elements, each of said elements having a plurality of slots in spaced relationship to each other and extending from one side of said strip in generally transverse direction for a distance of about one-half the width of said strip providing two sets of said strips, each of said sets being in parallel spaced relationship to each other, assembling said strips in interdigitating relationship by engaging the slots of one set of strips with the slots of the other set of strips and subsequently positioning said interdigitating configuration of strips in a grid configuration,
   raising the temperature of the edges of the strips on one major face of the grid configuration to a temperature sufficient to permit thermoplastic flow and
   applying pressure to the heated portion of the strips to form a flange and to bond said heated portions of one set of strips to the adjacent heated portions of the other set of strips.

3. A method of preparing a generally rectangular grid structure from a plurality of elongated thermoplastic strips, said method comprising
   supplying a plurality of elongated thermoplastic resinous strips, each of said strips having a plurality of slots in parallel spaced relationship to each other extending from one edge of the strip in a generally transverse direction for a distance of about one-half the width of said strips, each of said slots having a width sufficient to receive a similar strip,
   assembling said strips to form a grid structure wherein two sets of said strips are providde, each of said sets comprising a plurality of strips in generally parallel spaced relationship, each of said sets being in angular relationship to each other and the slots of each set being passed into the slots of the opposite set to form a plurality of lap joints thereby forming a loose grid-like structure flanging the edges of said strips while the loose grid-like structure is in a desired configuration by heating the edges of said strips to a temperature sufficiently high to cause plastic flow wherein the strips of one set are bonded to the strips of the other set, subsequently cooling the strips below the plastic flow temperature thereby providing a rigid grid structure.

4. The method of claim 3, including the step of collapsing the grid-like structure to a generally flat configuration while maintaining the slots in engagement with a strip of the opposite set and subsequently reforming the loose grid-like structure.

References Cited

UNITED STATES PATENTS

| | | | |
|---|---|---|---|
| 2,053,135 | 9/1936 | Dalton | 161—68 X |
| 2,388,297 | 11/1945 | Slaughter | 264—249 X |
| 2,833,683 | 5/1958 | Quandt | 156—306 X |
| 2,910,153 | 10/1959 | Campbell | 161—68 X |
| 2,952,079 | 9/1960 | Koch | 35—1 |
| 2,974,817 | 3/1961 | Simpson | 217—31 |
| 2,994,361 | 8/1961 | Gable et al. | 264—248 |
| 3,018,209 | 1/1962 | Dijksterhuis et al. | 161—68 X |
| 3,180,774 | 4/1965 | Koch | 156—73 |
| 3,189,335 | 6/1965 | Fuller et al. | 261—112 |

EARL M. BERGERT, *Primary Examiner.*

H. F. EPSTEIN, *Assistant Examiner.*